United States Patent
Henderson

(10) Patent No.: US 11,282,087 B2
(45) Date of Patent: Mar. 22, 2022

(54) USING TRANSACTION DATA FROM FIRST TRANSACTION FOR SECOND TRANSACTION

(71) Applicant: Block, Inc., San Francisco, CA (US)

(72) Inventor: William Henderson, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/983,534

(22) Filed: Aug. 3, 2020

(65) Prior Publication Data

US 2020/0364714 A1 Nov. 19, 2020

Related U.S. Application Data

(63) Continuation of application No. 16/291,980, filed on Mar. 4, 2019, now Pat. No. 10,817,881, which is a continuation of application No. 14/918,814, filed on Oct. 21, 2015, now Pat. No. 10,229,412, which is a continuation of application No. 13/943,617, filed on Jul. 16, 2013, now abandoned.

(60) Provisional application No. 61/700,555, filed on Sep. 13, 2012.

(51) Int. Cl.
 *G06Q 20/40* (2012.01)
 *G06Q 20/34* (2012.01)
 *G06Q 20/38* (2012.01)
 *G06Q 20/22* (2012.01)

(52) U.S. Cl.
 CPC ........ *G06Q 20/405* (2013.01); *G06Q 20/227* (2013.01); *G06Q 20/348* (2013.01); *G06Q 20/3567* (2013.01); *G06Q 20/387* (2013.01)

(58) Field of Classification Search
 None
 See application file for complete search history.

(56) References Cited

U.S. PATENT DOCUMENTS

| | | |
|---|---|---|
| 2,666,655 A | 1/1954 | Wolowitz |
| 2,811,796 A | 11/1957 | Schoelles |
| 3,606,138 A | 9/1971 | Allison |
| D271,985 S | 12/1983 | Belser |
| 5,467,917 A | 11/1995 | Potter |
| 5,629,977 A | 5/1997 | Fonseca |

(Continued)

FOREIGN PATENT DOCUMENTS

| | | |
|---|---|---|
| WO | 2012/051072 A1 | 4/2012 |
| WO | 2014/108916 A1 | 7/2014 |

OTHER PUBLICATIONS

Non-Final Office Action dated Nov. 24, 2020, for U.S. Appl. No. 16/251,381, of Varma, A. et al., filed Jan. 18, 2019.

(Continued)

*Primary Examiner* — Scott A Zare
(74) *Attorney, Agent, or Firm* — Polsinelli PC—Square

(57) ABSTRACT

A computer-implemented method for providing payment account information in a user account by receiving payment card information by a card reader at a point of sale. An account can be created when the payment card information is read by the card reader. Optionally, a gift card can be scanned prior to the creation of the account, and the gift card information can be combined with the payment card information. The gift card can be an electronic gift card which can be personalized with textual, visual, video, and/or audio portions.

22 Claims, 5 Drawing Sheets

(56) References Cited

U.S. PATENT DOCUMENTS

| | | | |
|---|---|---|---|
| D396,055 S | 7/1998 | Ritchey | |
| D504,159 S | 4/2005 | Best et al. | |
| D512,456 S | 12/2005 | Diaz et al. | |
| D531,187 S | 10/2006 | Gusmorino et al. | |
| 7,222,797 B2 | 5/2007 | Davilla et al. | |
| D550,248 S | 9/2007 | Jewitt et al. | |
| D569,902 S | 5/2008 | Chang et al. | |
| D575,332 S | 8/2008 | Parker et al. | |
| D582,931 S | 12/2008 | Blankenship et al. | |
| 7,490,720 B2 | 2/2009 | Cole et al. | |
| 7,523,858 B2 | 4/2009 | Moulton et al. | |
| D593,118 S | 5/2009 | Nathan et al. | |
| 7,529,710 B1 | 5/2009 | Clower et al. | |
| D612,862 S | 3/2010 | Fletcher et al. | |
| D613,300 S | 4/2010 | Chaudhri | |
| D622,763 S | 8/2010 | Lamm et al. | |
| D624,927 S | 10/2010 | Allen et al. | |
| D624,934 S | 10/2010 | Umezawa | |
| 7,908,202 B2 | 3/2011 | Graff | |
| 7,908,262 B2 | 3/2011 | Agranoff et al. | |
| D638,439 S | 5/2011 | Cavanaugh et al. | |
| D640,284 S | 6/2011 | Woo et al. | |
| 7,975,927 B1 | 7/2011 | Whitney | |
| 8,002,197 B1 | 8/2011 | Whitaker | |
| D645,876 S | 9/2011 | Cavanaugh et al. | |
| 8,027,881 B2 | 9/2011 | Granich | |
| D647,915 S | 11/2011 | Urdan et al. | |
| 8,127,999 B2 | 3/2012 | Diamond | |
| 8,132,668 B2 | 3/2012 | Davis | |
| 8,271,327 B2 | 9/2012 | Walker et al. | |
| D685,842 S | 7/2013 | Glass et al. | |
| 8,484,078 B1* | 7/2013 | Mankoff | G06Q 30/0226 705/14.17 |
| 8,538,863 B1 | 9/2013 | Saunders | |
| D695,314 S | 12/2013 | Jang et al. | |
| 8,662,387 B1 | 3/2014 | Geller et al. | |
| D703,230 S | 4/2014 | Abratowski et al. | |
| D704,735 S | 5/2014 | Hollobaugh et al. | |
| 8,719,094 B1 | 5/2014 | Klein et al. | |
| D706,816 S | 6/2014 | Holz et al. | |
| D734,388 S | 7/2015 | Lin et al. | |
| 9,129,273 B2 | 9/2015 | Baldwin et al. | |
| 9,135,612 B1 | 9/2015 | Proctor, Jr. et al. | |
| 9,607,318 B1 | 3/2017 | Gerchikov et al. | |
| 9,805,366 B1* | 10/2017 | Wilson | G06Q 20/382 |
| 10,013,136 B2 | 7/2018 | Bachman et al. | |
| 10,217,130 B1 | 2/2019 | Varma et al. | |
| 10,229,412 B1 | 3/2019 | Henderson | |
| 10,984,414 B1 | 4/2021 | Wilson et al. | |
| 2002/0023059 A1 | 2/2002 | Bari et al. | |
| 2002/0046116 A1 | 4/2002 | Hohle et al. | |
| 2002/0062281 A1 | 5/2002 | Singhal | |
| 2002/0100797 A1 | 8/2002 | Hollingsworth et al. | |
| 2002/0120582 A1 | 8/2002 | Elston et al. | |
| 2002/0184500 A1 | 12/2002 | Maritzen et al. | |
| 2003/0126094 A1 | 7/2003 | Fisher et al. | |
| 2003/0154406 A1 | 8/2003 | Honarvar et al. | |
| 2003/0187784 A1 | 10/2003 | Maritzen et al. | |
| 2003/0206169 A1 | 11/2003 | Springer et al. | |
| 2004/0049420 A1 | 3/2004 | Carlson et al. | |
| 2004/0140361 A1 | 7/2004 | Paul et al. | |
| 2004/0230610 A1 | 11/2004 | Gutierrez-Sheris | |
| 2004/0249753 A1 | 12/2004 | Blinn et al. | |
| 2005/0249389 A1 | 11/2005 | Knowles | |
| 2005/0283436 A1 | 12/2005 | Greer et al. | |
| 2006/0085513 A1 | 4/2006 | Malik | |
| 2006/0089909 A1 | 4/2006 | McLeod et al. | |
| 2006/0168150 A1 | 7/2006 | Naik et al. | |
| 2007/0017973 A1 | 1/2007 | Blank et al. | |
| 2007/0022008 A1* | 1/2007 | Kingsborough | G06Q 20/10 705/14.17 |
| 2007/0080196 A1 | 4/2007 | Rosenkranz et al. | |
| 2007/0084907 A1 | 4/2007 | Kranz | |
| 2007/0299774 A1 | 12/2007 | Eaves | |
| 2008/0103905 A1 | 5/2008 | Nixon-Lane | |
| 2008/0123828 A1 | 5/2008 | Mayer | |
| 2008/0163257 A1 | 7/2008 | Carlson et al. | |
| 2008/0167027 A1 | 7/2008 | Gautier et al. | |
| 2008/0167991 A1 | 7/2008 | Carlson et al. | |
| 2008/0177604 A1 | 7/2008 | Shaw et al. | |
| 2008/0262928 A1 | 10/2008 | Michaelis | |
| 2009/0157531 A1 | 6/2009 | Bui | |
| 2009/0165343 A1 | 7/2009 | Miller et al. | |
| 2009/0171836 A1 | 7/2009 | Olliphant et al. | |
| 2009/0171844 A1 | 7/2009 | Olliphant et al. | |
| 2009/0266724 A1 | 10/2009 | Norman | |
| 2009/0313138 A1 | 12/2009 | Ratnakar | |
| 2010/0010918 A1 | 1/2010 | Hunt | |
| 2010/0019030 A1 | 1/2010 | Monk | |
| 2010/0081457 A1 | 4/2010 | Jerome et al. | |
| 2010/0089990 A1 | 4/2010 | Spaulding | |
| 2010/0138344 A1 | 6/2010 | Wong et al. | |
| 2010/0174626 A1 | 7/2010 | Stringfellow et al. | |
| 2010/0250410 A1 | 9/2010 | Song et al. | |
| 2010/0276484 A1 | 11/2010 | Banerjee et al. | |
| 2010/0314442 A1 | 12/2010 | Hildred | |
| 2011/0106698 A1 | 5/2011 | Isaacson et al. | |
| 2011/0125607 A1 | 5/2011 | Wilen | |
| 2011/0155799 A1 | 6/2011 | Meszaros et al. | |
| 2011/0181443 A1 | 7/2011 | Gutierrez et al. | |
| 2011/0238476 A1 | 9/2011 | Carr et al. | |
| 2011/0238517 A1 | 9/2011 | Ramalingam et al. | |
| 2011/0291945 A1 | 12/2011 | Ewing, Jr. et al. | |
| 2012/0016731 A1 | 1/2012 | Smith et al. | |
| 2012/0022924 A1 | 1/2012 | Runnels et al. | |
| 2012/0066043 A1 | 3/2012 | Carmichael et al. | |
| 2012/0078783 A1 | 3/2012 | Park | |
| 2012/0095907 A1 | 4/2012 | Dorsey et al. | |
| 2012/0101944 A1 | 4/2012 | Lin et al. | |
| 2012/0109787 A1 | 5/2012 | Larrick et al. | |
| 2012/0118949 A1 | 5/2012 | Diamond | |
| 2012/0136789 A1 | 5/2012 | Kendrick et al. | |
| 2012/0150605 A1 | 6/2012 | Isaacson et al. | |
| 2012/0166334 A1 | 6/2012 | Kimberg et al. | |
| 2012/0171990 A1 | 7/2012 | Williams et al. | |
| 2012/0185317 A1 | 7/2012 | Wong | |
| 2012/0191513 A1 | 7/2012 | Ocher | |
| 2012/0197773 A1 | 8/2012 | Grigg et al. | |
| 2012/0221475 A1 | 8/2012 | Grigg et al. | |
| 2012/0234911 A1 | 9/2012 | Yankovich et al. | |
| 2012/0259842 A1 | 10/2012 | Oman et al. | |
| 2012/0290368 A1 | 11/2012 | Im | |
| 2013/0046635 A1 | 2/2013 | Grigg et al. | |
| 2013/0046686 A1 | 2/2013 | Ress et al. | |
| 2013/0073459 A1 | 3/2013 | Zacarias et al. | |
| 2013/0124855 A1 | 5/2013 | Varadarajan et al. | |
| 2013/0132274 A1 | 5/2013 | Henderson et al. | |
| 2013/0159086 A1 | 6/2013 | Richard | |
| 2013/0246220 A1 | 9/2013 | Hammad et al. | |
| 2013/0346911 A1 | 12/2013 | Sripada | |
| 2014/0019352 A1 | 1/2014 | Shrivastava | |
| 2014/0058873 A1 | 2/2014 | Sorensen et al. | |
| 2014/0074581 A1 | 3/2014 | Johnson et al. | |
| 2014/0157186 A1 | 6/2014 | Bhat et al. | |
| 2014/0183265 A1 | 7/2014 | Bamings et al. | |
| 2014/0195419 A1 | 7/2014 | Sim et al. | |
| 2014/0203088 A1 | 7/2014 | Eng | |
| 2014/0222596 A1 | 8/2014 | S | |
| 2015/0269560 A1 | 9/2015 | Barrett | |
| 2015/0310419 A1 | 10/2015 | Kadaster et al. | |
| 2015/0310477 A1* | 10/2015 | Mankoff | G06Q 30/0226 705/14.27 |
| 2015/0356563 A1 | 12/2015 | Vohra et al. | |
| 2016/0012465 A1 | 1/2016 | Sharp | |
| 2017/0200198 A1 | 7/2017 | Grucci et al. | |
| 2018/0114213 A1 | 4/2018 | Kranzley et al. | |
| 2019/0197540 A1 | 6/2019 | Henderson | |

(56) References Cited

U.S. PATENT DOCUMENTS

2019/0355047 A1  11/2019  Scipioni
2020/0258084 A1  8/2020  Henderson

OTHER PUBLICATIONS

Notice of Allowance dated Dec. 9, 2020, for U.S. Appl. No. 15/797,939, of Wilson, M., et al., filed Oct. 30, 2017.
Non-Final Office Action dated Jan. 15, 2021, for U.S. Appl. No. 16/864,915, of Henderson, W., filed May 1, 2020.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Mohamed, N. and Al-Jaroodi, J., "Temporal Web Alerts," 2010 Seventh International Conference on Information Technology: New Generations, published on Apr. 1, 2010, pp. 637-641.
Non-Final Office Action dated Jun. 27, 2014, for Design U.S. Appl. No. 29/437,478, of Lin, A., et al., filed Nov. 16, 2012.
Non-Final Office Action dated Aug. 18, 2014, for Design U.S. Appl. No. 29/437,474, of Andersen, R., et al., filed Nov. 16, 2012.
Non-Final Office Action dated Aug. 18, 2014, for Design U.S. Appl. No. 29/437,475, of Andersen, R., filed Nov. 16, 2012.
Non-Final Office Action dated Sep. 12, 2014, for U.S. Appl. No. 13/951,410, of Varma, A., et al., filed Jul. 25, 2013.
Non-Final Office Action dated Nov. 20, 2014, for U.S. Appl. No. 13/943,617, of Henderson, W., filed Jul. 16, 2013.
Final Office Action dated Dec. 11, 2014, for Design U.S. Appl. No. 29/437,474, of Andersen, R., et al., filed Nov. 16, 2012.
Notice of Allowance dated Mar. 13, 2015, for Design U.S. Appl. No. 29/437,478, of Lin, A., et al., filed Nov. 16, 2012.
Final Office Action dated Apr. 6, 2015, for U.S. Appl. No. 13/951,410, of Varma, A., et al., filed Jul. 25, 2013.
Non-Final Office Action dated May 13, 2015, for U.S. Appl. No. 14/027,706, of Wilson, M., et al., filed Sep. 16, 2013.
Final Office Action dated Sep. 9, 2015, for U.S. Appl. No. 14/027,706, of Wilson, M., et al., filed Sep. 16, 2013.
Non-Final Office Action dated Oct. 9, 2015, for U.S. Appl. No. 13/951,410, of Varma, A., et al., filed Jul. 25, 2013.
Non-Final Office Action dated Feb. 11, 2016, for U.S. Appl. No. 14/092,724, of Varma, A., et al., filed Nov. 27, 2013.
Final Office Action dated Apr. 28, 2016, for U.S. Appl. No. 13/951,410, of Varma, A., et al., filed Jul. 25, 2013.
Non-Final Office Action dated May 5, 2016, for U.S. Appl. No. 14/027,706, of Wilson, M., et al., filed Sep. 16, 2013.
Final Office Action dated Sep. 8, 2016, for U.S. Appl. No. 14/027,706, of Wilson, M., et al., filed Sep. 16, 2013.
Final Office Action dated Sep. 23, 2016, for U.S. Appl. No. 14/092,724, of Varma, A., et al., filed Nov. 27, 2013.
Non-Final Office Action dated Nov. 18, 2016, for U.S. Appl. No. 14/282,215, of Poursartip, A., filed May 20, 2014.
Advisory Action dated Dec. 20, 2016, for U.S. Appl. No. 14/027,706, of Wilson, M., et al., filed Sep. 16, 2013.
Advisory Action dated Jan. 13, 2017, for U.S. Appl. No. 14/092,724, of Varma, A., et al., filed Nov. 27, 2013.
Non-Final Office Action dated Feb. 9, 2017, for U.S. Appl. No. 14/027,706, of Wilson, M., et al., filed Sep. 16, 2013.
Non-Final Office Action dated Mar. 23, 2017, for U.S. Appl. No. 13/951,410, of Varma, A., et al., filed Jul. 25, 2013.
Final Office Action dated Mar. 28, 2017, for U.S. Appl. No. 14/282,215, of Poursartip, A., filed May 20, 2014.
Notice of Allowance dated Jun. 28, 2017, for U.S. Appl. No. 14/027,706, of Wilson, M., et al., filed Sep. 16, 2013.
Non-Final Office Action dated Jun. 28, 2017, for U.S. Appl. No. 14/092,724, of Varma, A., et al., filed Nov. 27, 2013.
Non-Final Office Action dated Jul. 28, 2017, for U.S. Appl. No. 14/282,215, of Poursartip, A., filed May 20, 2014.
Final Office Action dated Oct. 16, 2017, for U.S. Appl. No. 13/951,410, of Varma, A., et al., filed Jul. 25, 2013.
Final Office Action dated Dec. 12, 2017, for U.S. Appl. No. 14/092,724, of Varma, A., et al., filed Nov. 27, 2013.
Final Office Action dated Feb. 27, 2018, for U.S. Appl. No. 14/282,215, of Poursartip, A., filed May 20, 2014.
Advisory Action dated Mar. 8, 2018, for U.S. Appl. No. 14/092,724, of Varma, A., et al., filed Nov. 27, 2013.
Non-Final Office Action dated May 3, 2018, for U.S. Appl. No. 14/918,814, of Henderson, W., filed Oct. 21, 2015.
Advisory Action dated Jun. 11, 2018, for U.S. Appl. No. 14/092,724, of Varma, A., et al., filed Nov. 27, 2013.
Notice of Allowance dated Oct. 10, 2018, for U.S. Appl. No. 14/092,724, of Varma, A., et al., filed Nov. 27, 2013.
Notice of Allowance dated Oct. 26, 2018, for U.S. Appl. No. 14/918,814, of Henderson, W., filed Oct. 21, 2015.
Non-Final Office Action dated Dec. 4, 2018, for U.S. Appl. No. 14/282,215, of Poursartip, A., filed May 20, 2014.
Final Office Action dated Apr. 12, 2019, for U.S. Appl. No. 14/282,215, of Poursartip, A., filed May 20, 2014.
Advisory Action dated Jun. 21, 2019, for U.S. Appl. No. 14/282,215, of Poursartip, A., filed May 20, 2014.
Non-Final Office Action dated Sep. 12, 2019, for U.S. Appl. No. 15/886,228, of Varma, A., et al., filed Feb. 1, 2018.
Non-Final Office Action dated Sep. 16, 2019, for U.S. Appl. No. 16/291,980, of Henderson, W., filed Mar. 4, 2019.
Non-Final Office Action dated Nov. 8, 2019, for U.S. Appl. No. 15/797,939, of Wilson, M., et al., filed Oct. 30, 2017.
Non-Final Office Action dated Jan. 29, 2020, for U.S. Appl. No. 16/251,381, of Varma, A. et al., filed Jan. 18, 2019.
Non-Final Office Action dated Jan. 30, 2020, for U.S. Appl. No. 16/291,980, of Henderson, W., filed Mar. 4, 2019.
Final Office Action dated Mar. 16, 2020, for U.S. Appl. No. 15/886,228, of Varma, A., et al., filed Feb. 1, 2018.
Final Office Action dated Mar. 18, 2020, for U.S. Appl. No. 15/797,939, of Wilson, M., et al., filed Oct. 30, 2017.
Notice of Allowance dated Jun. 22, 2020, for U.S. Appl. No. 16/291,980, of Henderson, W., filed Mar. 4, 2019.
Non-Final Office Action dated Jun. 30, 2020, for U.S. Appl. No. 16/864,915, of Henderson, W., filed May 1, 2020.
Final Office Action dated Jul. 21, 2020, for U.S. Appl. No. 16/251,381, of Varma, A., et al., filed Jan. 18, 2019.
Advisory Action dated Sep. 28, 2020, for U.S. Appl. No. 16/251,381, of Varma, A. et al., filed Jan. 18, 2019.
Final Office Action dated Oct. 19, 2020, for U.S. Appl. No. 16/864,915, of Henderson, W., filed May 1, 2020.
Final Office Action dated Jun. 14, 2021, for U.S. Appl. No. 16/864,915, of Henderson, W., filed May 1, 2020.
Non-Final Office Action dated Dec. 30, 2020, for U.S. Appl. No. 15/886,228, of Varma, A., et al., filed Feb. 1, 2018.
Final Office Action dated Apr. 6, 2021, for U.S. Appl. No. 16/251,381, of Varma, A. et al., filed Jan. 18, 2019.
Notice of Allowance dated May 11, 2021, for U.S. Appl. No. 15/886,228, of Varma, A., et al., filed Feb. 1, 2018.
Advisory Action dated Aug. 26, 2021, for U.S. Appl. No. 16/864,915, of Henderson, W., filed May 1, 2020.
Non-Final Office Action dated Sep. 16, 2021, for U.S. Appl. No. 16/864,915, of Henderson, W., filed May 1, 2020.
Notice of Allowance dated Jan. 28, 2022, for U.S. Appl. No. 16/864,915, of Henderson, W., filed May 1, 2020.

* cited by examiner

USING TRANSACTION DATA FROM FIRST TRANSACTION FOR SECOND TRANSACTION

CROSS REFERENCE

This application claims priority to and is a continuation of U.S. patent application Ser. No. 16/291,980 entitled "Using Card Present Transaction Data to Generate Payment Transaction Account" which is a continuation of U.S. patent application Ser. No. 14/918,814, entitled "Using Card Present Transaction Data to Generate Payment Transaction Account," filed on Oct. 21, 2015, which is a continuation of U.S. patent application Ser. No. 13/943,617, entitled "Using Card Present Transaction Data to Generate Payment Transaction Account," filed on Jul. 16, 2013, which claims the benefit of U.S. Provisional Patent Application No. 61/700,555, filed on Sep. 13, 2012, each of which is incorporated by reference in its entirety.

BACKGROUND

Consumers routinely make purchases using payment cards, such as plastic credit or debit cards. Such plastic cards typically have magnetic stripes or chips that are encoded with information, such as a consumer's account information. A credit or a debit card may be used in a business transaction with a bank or creditor through use of a device that communicates with the bank or creditor, such as, for example an automated teller machine (ATM) or a credit card reader.

Credit cards having standard specifications can typically be read by point-of-sale devices at the location of a merchant. When the card is coupled to an electronic card reader at the merchant, such as a platform card reader, the electronic card reader may use its built-in communications interface to contact a creditor that handles credit authentication requests to process the transaction. The transaction may be finalized upon verification of the consumer's account information and the receipt of an approval signal from the creditor.

Despite the prevalence of systems and methods that implement point of sale transactions using plastic cards, plastic cards can prove problematic in situations in which a merchant does not accept payment using a plastic card or a communications link from the merchant to the creditor is inoperable.

SUMMARY

A need may exist for the use of payment systems that do not require the presence of plastic cards at point of sale transactions. This can occur with the user of user accounts that can have payment information associated therewith. In some embodiments, the user accounts can be created and/or payment information can be associated with user accounts based on an initial read of a payment card. In future transactions, the payment cards need not be swiped, and the payment card information associated with the user account can be used.

A computer-implemented method may be provided, said method comprising: receiving consent from the payer to enter into a payment transaction with the merchant without the presence of a payment card; upon receiving consent, providing the merchant with information identifying the payer, the information including at least one of a name or a photo of the payer; receiving, from the merchant, a selection of the payer's user account and an instruction to process the payment transaction with the payer; and using a gift card associated with the payer's user account to process the payment transaction. One or more of the steps may be performed with aid of a programmable processor.

Additionally, a computer-implemented method for creating a user account may be provided, comprising: receiving payment card information from a card reader at a point of sale; and creating, with aid of a processor, a user account including the payment card information for an individual that provided the payment card at the point of sale, wherein the user account can be used for future transactions using the payment card information without the presence of the payment card.

Aspects may include a computer-implemented method for adding payment information to a user account, comprising: receiving payment card information from a card reader at a point of sale; and storing, in a memory, the payment card information for a user that provided the payment card at the point of sale and associating the payment card with the user's account, wherein the user account can be used for future transactions using the payment card information without the presence of the payment card.

Also, a system for creating a user account may be provided, said system comprising: a card reader at a point of sale configured to read payment card information; a scanner at the point of sale configured to read gift card information; and a programmable processor configured to receive the payment card information and the gift card information, and create a user account including the payment card information and the gift card information for an individual that provided the payment card and the gift card at the point of sale, wherein the user account can be used for future transactions using the payment card information without the presence of the payment card.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages will be obtained by reference to the following detailed description that sets forth illustrative embodiments, and the accompanying drawings or figures (also "FIG." or "FIGS." herein) of which:

DETAILED DESCRIPTION

Figure 1:
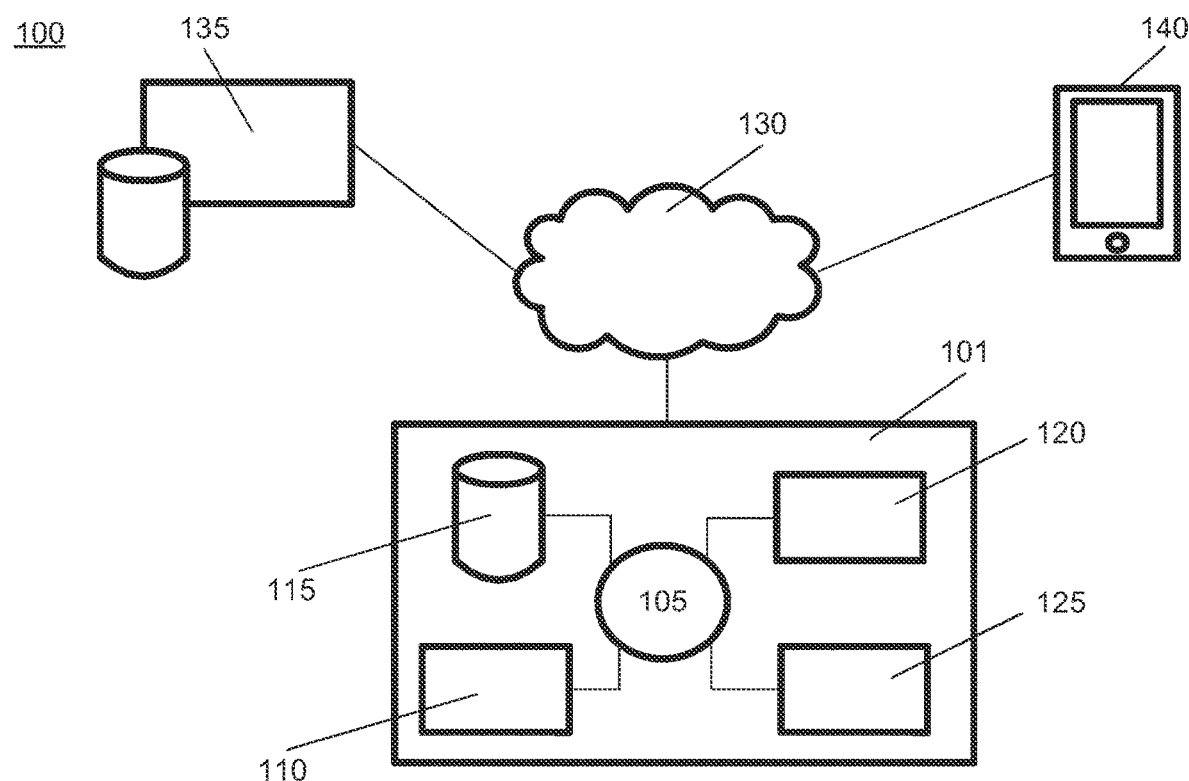
FIG. 1 schematically illustrates an aspect of a mobile payment system, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "merchant," as used herein, generally refers to an individual, business or other entity, the occupation of which is the sale of goods for profit or, alternatively, trade of an item of value for another item of value. In an example, a merchant is a retail business or a shopkeeper. A merchant may be an online business or entity offering a product or service for profit of trade. Examples of merchants include, without limitation, food stores, grocery stores, electronic stores, department stores, bars, clubs, restaurants, mobile merchants (e.g., food trucks) and book stores.

The term "user," as used herein, generally refers to an individual or entity that uses systems and methods of the disclosure. A user can be an individual or entity that wishes to purchase a product or service of a merchant. A user can be a payer. In some situations, a user may be a consumer, buyer, or purchaser.

In one aspect, systems and methods use transaction information to generate or supplement a user account. Various aspects described herein can be applied to any of the particular applications set forth below, alone or in combination, or for any other types of financial transaction system at one or more point of sale. The embodiments described herein may be applied as a standalone system or method, or as part of an integrated consumer side and merchant side information handling system. It shall be understood that different aspects can be appreciated individually, collectively, or in combination with each other.

In some embodiments, a transaction system is provided at a point of sale, such as a merchant location. A buyer can purchase goods and/or services at the point of sale. In some embodiments, the merchant is a part of the transaction system which is capable of accessing user account information to facilitate a financial transaction. The transaction system can also have access to merchant information (e.g., transactions, inventory). For example, if the buyer is a user of the system, the merchant can access the buyer's user information to permit the financial transaction. In some instances, the buyer's account includes payment card information (e.g., credit/debit card number, expiration date, security code, cardholder name, etc.), which can be provided to the merchant during a financial transaction. The payment card information can be provided to the merchant without requiring the presence of the physical payment card. For instance, the buyer can have the physical payment card in his or her wallet, or does not have the physical payment card on his or her person, but the payment card information can be pulled from the user account and provided to the merchant regardless. A buyer can have a mobile device which can facilitate the transfer of the payment card information to the merchant. The payment card can be stored locally on the mobile device or can be stored remotely.

A buyer can create an account prior to approaching the point of sale and/or prior to conducting a transaction. For example, a buyer can register with the system using the buyer's mobile device or another device. The buyer can choose to enter payment card information through the buyer's device when creating the buyer's account. In some instances, a buyer types in or manually enters the buyer's payment card information when creating the buyer's account. The buyer's payment card information can be used at the point of sale without requiring the presence of the buyer's card.

Alternatively, the buyer can create an account prior to approaching the point of sale, but need not enter payment card information at the time of account creation. When the buyer reaches the point of sale and initiates the transaction with the buyer's payment card, the buyer can be presented with an option to store the payment card information in the buyer's account. Thus, in future transactions, the buyer is not required to have the physical payment card on his or her person in order to conduct a transaction. Linking the payment card to the buyer's account at the point of sale can provide a smooth process, without requiring the buyer to manually enter the payment card information. A swipe or other procedure can be used to collect the payment card information without requiring the physical entering of digits. This can reduce the likelihood of a mistake or inconvenience of having to physically enter the payment card. A 'one-swipe' technique can be used to link payment card information to an account. The use of the physical payment card can also provide a sense of security to the buyer and/or the merchant. For example, some buyers can be wary of entering sensitive information over a network, where the information may be intercepted. The merchants can also advantageously view a user with a physical payment card, and can optionally ask for identification for added reassurance of payment card validity and/or identity.

In another embodiment, the buyer need not create an account prior to approaching the point of sale. When the buyer reaches the point of sale and initiates the transaction with the buyer's payment card, the buyer can be presented with an option to create a user account which includes storing the payment card information in the buyer's account. The account can be created by using the payment card information. The buyer may also optionally be asked to provide supplemental information (e.g., the buyer's name, email address). In some instances, the buyer can be using a gift card during the same transaction. For example, the buyer can use a gift card, but the gift card balance may not be sufficient to cover the entire expense. The payment card can be used to cover the rest of the expense. The gift card can be an electronic gift card, which can include buyer information therein (e.g., the buyer's name, email address). The information from the gift card can automatically be pulled and combined with the payment card information to create a user account. In future transactions, the buyer is not required to have the physical payment card on his or her person in order to conduct a transaction. Creating the user account using the payment card and a gift card or other form of supplemental information can provide a smooth process, without requiring the buyer to manually enter any information ahead of time. Permitting an account to be created with merely swipe and/or a scan can encourage the creation of accounts, as little or no extra time or effort is required on the buyer's end. The buyer need not manually enter any information in the creation of the account. In some instances, no manual entry of information is required, either prior to arriving at the point of sale, or at the point of sale. Thus a 'one-swipe' and/or 'swipe/scan-only' technique can be used to create an account. This can also reduce the likelihood of a mistake or inconvenience of having to physically enter information. The use of the physical payment card and/or gift card can also provide a sense of security to the buyer and/or the merchant.

In one aspect, systems are configured to implement methods of the disclosure. The systems may be directed to aspects of a mobile payment system in accordance with an embodiment of the invention. The systems can include a computer server ("server") that is operatively coupled to an electronic device of a user and/or an electronic device of a merchant. Any description of a server may apply to a single server or multiple servers in communication with one another. A server may be a consolidated or distributed system. In some instances, any description of a server may apply to a cloud computing infrastructure.

FIG. 1 shows a system 100 adapted to enable a user to interact with merchants, in accordance with an embodiment of the invention. The system 100 includes a central computer server ("server") 101 that is programmed to implement one or more of the exemplary methods described herein. The server 101 includes a central processing unit (CPU, also "processor" and "computer processor" herein) 105, which can be a single core or multi core processor, or a plurality of processors for parallel processing. The server 101 also includes memory 110 (e.g., random-access memory, read-only memory, flash memory), electronic storage unit 115 (e.g., hard disk), communications interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communications bus (solid lines), such as a motherboard. The storage unit 115 can be a data storage unit (or data repository) for storing data. The server 101 is operatively coupled to a computer network ("network") 130 with the aid of the communications interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130 in some cases, with the aid of the server 101, can implement a peer-to-peer network, which may enable devices coupled to the server 101 to behave as a client or a server.

The storage unit 115 can store files, such as filed related to merchant profiles and/or accounts, and user profiles. The server 101 in some cases can include one or more additional data storage units that are external to the server 101, such as located on a remote server that is in communication with the server 101 through an intranet or the Internet.

The storage unit 115 can store user and merchant transactional information. The storage unit 115 can store user transactional information, which can include, without limitation, personal information about the user (e.g., the user name, contact information), financial information (e.g., e.g., user payment card number, expiration date, security code, cardholder name), merchants from which the user has purchased products and/or services, the number of times the user has used a merchant, the frequency with which the user purchases products and/or services from a merchant, the types of merchants from which the user purchases products and/or services.

The server 101 can communicate with one or more remote computer systems through the network 130. In the illustrated example, the server 101 is in communication with a first computer system 135 and a second computer system 140 that are located remotely with respect to the server 101. In the illustrated example, the first computer system 135 is a merchant computer system that may have a database for recording transaction data, and the second computer system 140 is a user computer system, such as a computer system of a potential purchaser of a service or product of the merchant. The first computer system 135 and second computer system 140 can be, for example, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants.

In an example, the second computer system 140 is a portable electronic device of a user that desires to search for and find merchants at or in proximity to a geolocation of the user. If the second computer system is sufficiently close to a merchant, the second computer system may communicate with the server and/or the first computer system. The user can access the server 101 via the network 130 to request the search. The server 101 can conduct the search and transmit search results to the second computer system 140 of the user. The search results can be displayed on a graphical user interface of the second computer system 140. In some cases, both the first computer system 135 and the second computer system 140 have a geolocation.

In some situations the system 100 includes a single server 101. In other situations, the system 100 includes multiple servers in communication with one another through an intranet and/or the Internet.

The server 101 can be adapted to store user profile information, such as, for example, a name, physical address, email address, telephone number, instant messaging (IM) handle, payment information, educational information, work information, social likes and/or dislikes, products likes and/or dislikes, merchant preferences, favorites types of merchants (e.g., restaurants preferred over bars) and historical information of past transactions of the user (which may be transactions made using the system 100), and other information of potential relevance to the user or other users. Such profile information can be stored on the storage unit 115 of the server 101.

Methods as described herein can be implemented by way of machine (or computer processor) executable code (or software) stored on an electronic storage location of the server 101, such as, for example, on the memory 110 or electronic storage unit 115. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110. Alternatively, the code can be executed on the second computer system 140 of the user.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Non-transitory computer readable media can be stored in one or more memory unit described herein. The computer readable media can include code, logic, or instructions for performing one or more steps described herein.

Aspects of the systems and methods provided herein, such as the server 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which can provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also can be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, the server 101 can be configured for data mining, extract, transform and load (ETL), or spidering (including Web Spidering where the system retrieves data from remote systems over a network and access an Application Programmer Interface or parses the resulting markup) operations, which may permit the system to load information from a raw data source (or mined data) into a data warehouse. The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+®, Linkedin®) or on publisher sites, such as, for example, weblogs.

The results of a user-initiated search for merchants can be presented to a user with the aid of a user interface (UI), such as a graphical user interface (GUI), on an electronic device of the user. In some situations, a GUI can enable a user to access the results of a search for entertainment events at a designated geographic.

The UI, such as GUI, can be provided on a display of an electronic device of the user that is adapted to provide geolocation information of the user, such as, for example, measure (or calculate) the geolocation of the user. The display can be a capacitive or resistive touch display, or a head-mountable display (e.g., Google® Goggles). Such displays can be used with other systems and methods of the disclosure.

Methods of the disclosure may be facilitated with the aid of applications (apps) that may be installed on electronic devices of users. An app can include a GUI on a display of the electronic device of the user.

Systems of the disclosure may include both payer and merchant data. This advantageously permits a system to determine relevance ranking that can be user specific and directed at select one or more merchants or types of merchants. The system can be owned and/or operated by a single entity.

In some cases, the merchant and/or payer information can be stored in a memory location of the system. Accordingly, relevance ranking may be a function of both payer and merchant information. For instance, a merchant may intend to target payers of a given age group. In some cases, a search for merchants by a payer can provide merchants that consider the payer to be relevant to the merchants.

Figure 2:
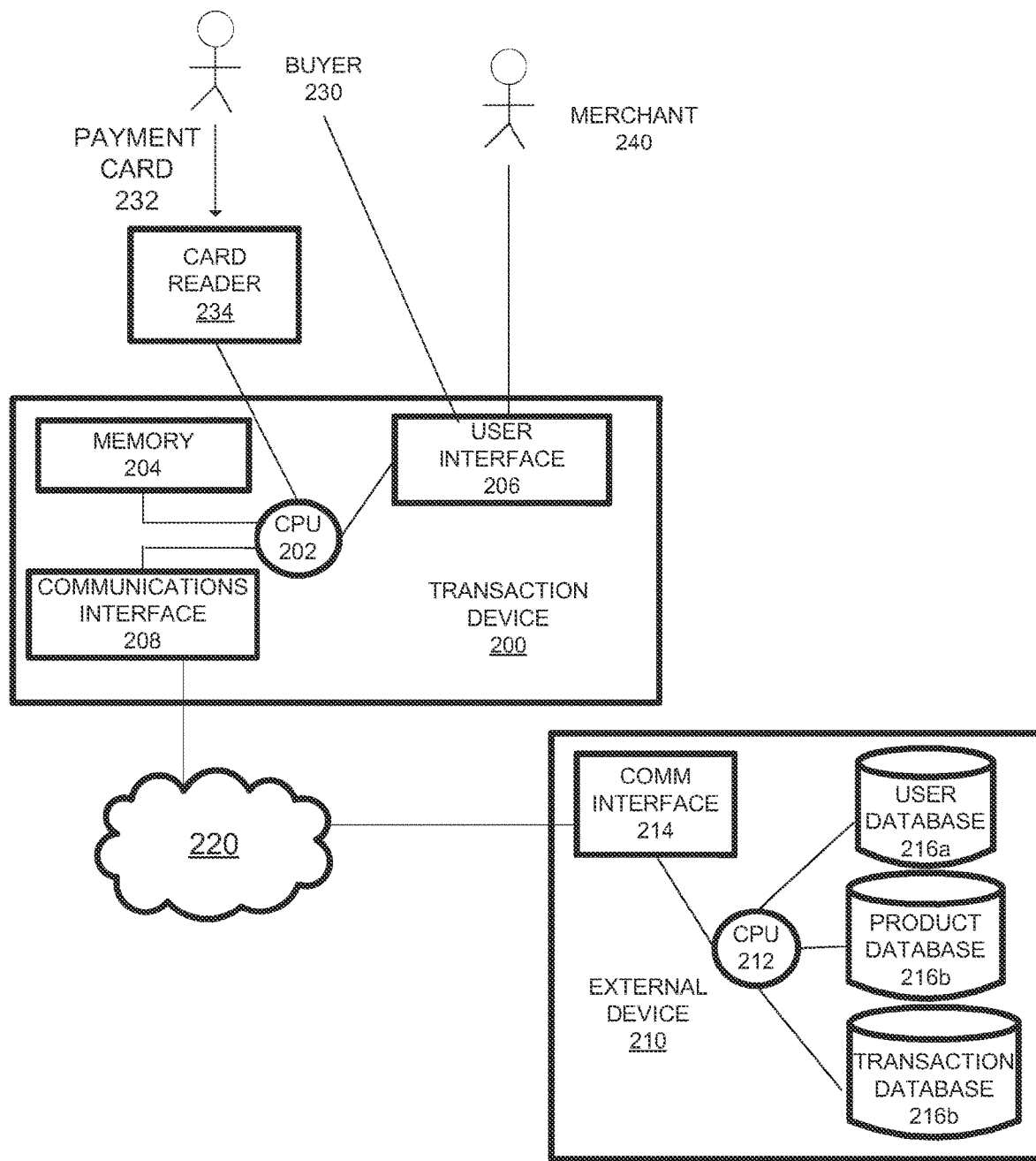
FIG. 2 provides an example of an aspect of a mobile payment system provided in accordance with an embodiment of the invention.

FIG. 2 provides an example of an aspect of a mobile payment system provided in accordance with an embodiment of the invention. One or more transaction device 200 can communicate with one or more external device 210 across a network 220.

The transaction device 200 can be provided at a point-of-sale (POS). The POS may be at a merchant location, such as a location of a store, business, or physical point of a financial transaction. Examples of POS locations include, without limitation, food stores, grocery stores, cafes, electronic stores, department stores, bars, clubs, restaurants and book stores. A POS can be the site of a transaction, such as purchase or exchange of items, goods, and/or services.

The transaction device 200 may be any type of device, such as personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The transaction device can be or can function as a register at a POS. The transaction device can have a central processing unit (CPU) 202, memory 204, user interface 206, and/or communications interface 208. These components have one or more features or characteristics as described elsewhere herein. The CPU can be in communication with the memory, user interface, and/or communications interface and/or can direct the operation of the transaction device.

The user interface 206 can be presented on an electronic display of the transaction device 200. The user interface can be presented through a web browser or application running on the transaction device. The electronic display can be a screen, such as an LED screen, OLED screen, LCD screen, plasma screen, and/or touchscreen (e.g., capacitive or resistive touch display). One or more individual associated with the merchant 240 can interact with the transaction device via the user interface. For example, the transaction device can function as a register, and a clerk can view information and enter information through the transaction device interface. In some instances, a buyer 230 may or may not directly interact with the transaction device. For example, a clerk can permit a buyer to enter information into the transaction device through the user interface. Alternatively, the buyer can provide information to the clerk who enters information to the user interface. The buyer can view information provided by the transaction device. Alternatively, the buyer does not view information displayed on the transaction device.

A card reader 234 can be provided in accordance with an embodiment of the invention. In one example, the buyer 230 can provide a payment card 232 which can be read by the card reader. The card reader can be coupled to or in communication with the transaction device 200. For example, the card reader can be communication with one or more processor 202 of the transaction device. In other examples, the card reader can communicate with the transaction device via one or more communication interface 208.

In some embodiments, the card reader 234 is integrated as a part of the transaction device 200. Alternatively, the card reader can be a separate device from the transaction device and can convey information to the transaction device. The card reader can communicate with the transaction device via a hard-wired or wireless connection. In some embodiments, the card reader is integrated as part of a mobile device that is capable of communicating with the transaction device. The card reader can be attached to or in communication with a mobile device that can communicate with the transaction device.

The card reader 234 can read information from the payment card 232 and transfer the information to the transaction device 200. The payment card can optionally be a physical card comprising a magnetic stripe, integrated chip, or have other forms of encoded information. The payment card can be a credit card, debit card, or other type of payment authenticating piece. The card reader can be capable of reading information from a magnetic chip, integrated chip or other forms of encoded information. For example, the card reader is capable of reading information from the payment card with a single swipe. The card reader can have a slot through which the payment card may pass through. The payment card can have a read head that can contact or come into close proximity to a magnetic strip of the payment card, an integrated chip of the payment card, or other encoded information on the payment card. Information read from the payment card can be transferred to via the transaction device in a raw form, which can decode the information. Alternatively, the card reader can decode some or all of the information prior to transferring the information to the transaction device. The transaction device can store information from the payment card in memory 204. The transaction device optionally sends information from the payment card via a communication interface 208 to an external device 210.

In some embodiments, the buyer can also present a gift card. Information can be collected from the gift card and provided to the transaction device. The gift card information can be read via the card reader, through a separate scanner, or any other peripheral device that can convey the information to the transaction device. Information from the gift card can be directly provided to the transaction device. A gift card can be a restricted monetary equivalent or an account having a stored value or a prepaid balance. The gift card can be received by the user as an electronic gift card. The gift card can have optically encoded information that can be scanned to convey information to the transaction device. Optionally, the buyer can have a mobile device or other device that can have gift card information. For example, the mobile device can convey electronic gift card information to the transaction device. The mobile device can display optically encoded information about the gift card, which can be read and conveyed to the transaction device. In one example, optically encoded information is read through a scanner, which can be communication with one or more processor of the transaction device. In other examples, the card reader can communicate with the transaction device via one or more communication interface.

The transaction device 200 can communicate with one or more external devices 210 over a network 220. The network can be a local area network (LAN) or wide area network (WAN), such as the Internet. The network can be a telecommunications network, such as a cell phone network, or data network.

An external device 210 may be any type of device, such as servers, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants.

The external device can have a CPU 212, communications interface 214, and/or memory, such as one or more databases 216a, 216b, 216c. The external device can optionally have a user interface. The external device can be at the POS. Alternatively, the external device can be remote to the POS and/or transaction device. The external device can be in a different facility or room than the POS and/or the transaction device. The external device can be at a different part of the world than the POS and/or transaction device.

In one example, a user database 216a, product database 216b, and/or transaction database 216c can be provided. The user database can include information about the user, such as the user's name, contact information (e.g., email address, mailing address, telephone number, social networks), date of birth, payment card information (e.g., payment card number, expiration date, cardholder name, security code), user account settings and/or preferences. The product database can include information about products that can be purchased. For example, merchant side information relating to available products, categories of products, costs, expiration dates, and/or inventory. The transaction database can include information about transactions (e.g., items that were purchased, financial exchange during purchase, fees, taxes, payment card information). The databases can be provided separately or combined. The databases can be provided in memories of different devices, or can be provided within one or more of the same device. The database can be provided in a memory of an external device, or can be provided separately from the external device and accessed by the external device. The device(s) can be in communication with one another so that information from the various databases can be accessed and/or aggregated. User information, product information, and/or transaction information can be pulled during a transaction, such as a financial transaction at a point of sale. Buyer account information can be stored in a single or multiple of the databases described herein. In some instances, a buyer account can include user information and/or financial information (e.g., payment information).

In accordance with an embodiment of the invention, a buyer 230 may approach a POS. The buyer can provide a payment card 232, which can be swiped or read by the card reader 234. The buyer and/or merchant 240 can interact with a transaction device 200. For example, the transaction device can have a screen that can include information that can be read by the merchant and/or buyer. For example, the screen can display information about one or more product that the buyer is purchasing from the merchant. Once the payment card has been swiped, information from the payment card can be provided to the transaction device. The transaction device can communicate over a network 220 with the external device. The communication may occur via a communication interface 208 of the transaction device and a communication interface 214 of the external device. The external device can access one or more databases 216a, 216b, 216c. For example, if the buyer already has a user account, information from the database pertaining to the user account can be transferred and/or displayed at the transaction device. If the buyer does not have a user account, a buyer can have an option of creating an account on the spot. Information about the payment card can be sent to from the transaction device to the external device. One or more database record can be created for the user, optionally using the payment card information. Optionally, supplemental information can be provided from the transaction device (e.g., provided by the user or merchant, or by a gift card) to the external device to be part of the database records. The information to be used in the user account can be parsed out on the transaction device side, and/or the external device side. Even if a user account already exists, a buyer can be presented with an option of adding the payment card information to the buyer's account. Information about the payment card can be sent from the transaction device to the external device and can be added to the database records.

Once a user account is created with information about a payment card, the payment card information can be used in future transactions. The user can conduct financial transactions with one or more merchants that are part of the system without having to swipe or bring the physical payment card. Thus a financial transaction can occur without requiring the presence of the physical card at the site of the transaction. The payment card information can be utilized in the transaction. The user account information can be accessed to bring up the payment card information without swiping the payment card. In some instances, the user can have a mobile device, such as a smartphone when conducting the future transactions. The mobile device of the user can be capable of giving the merchant permission to access the payment card information of the user from the user account, or the mobile device can access the payment card information from the user account and send necessary payment information to the transaction device. A user interface can be provided on the mobile device through which a user can select a payment card to be used in the electronic transaction.

Figure 3:
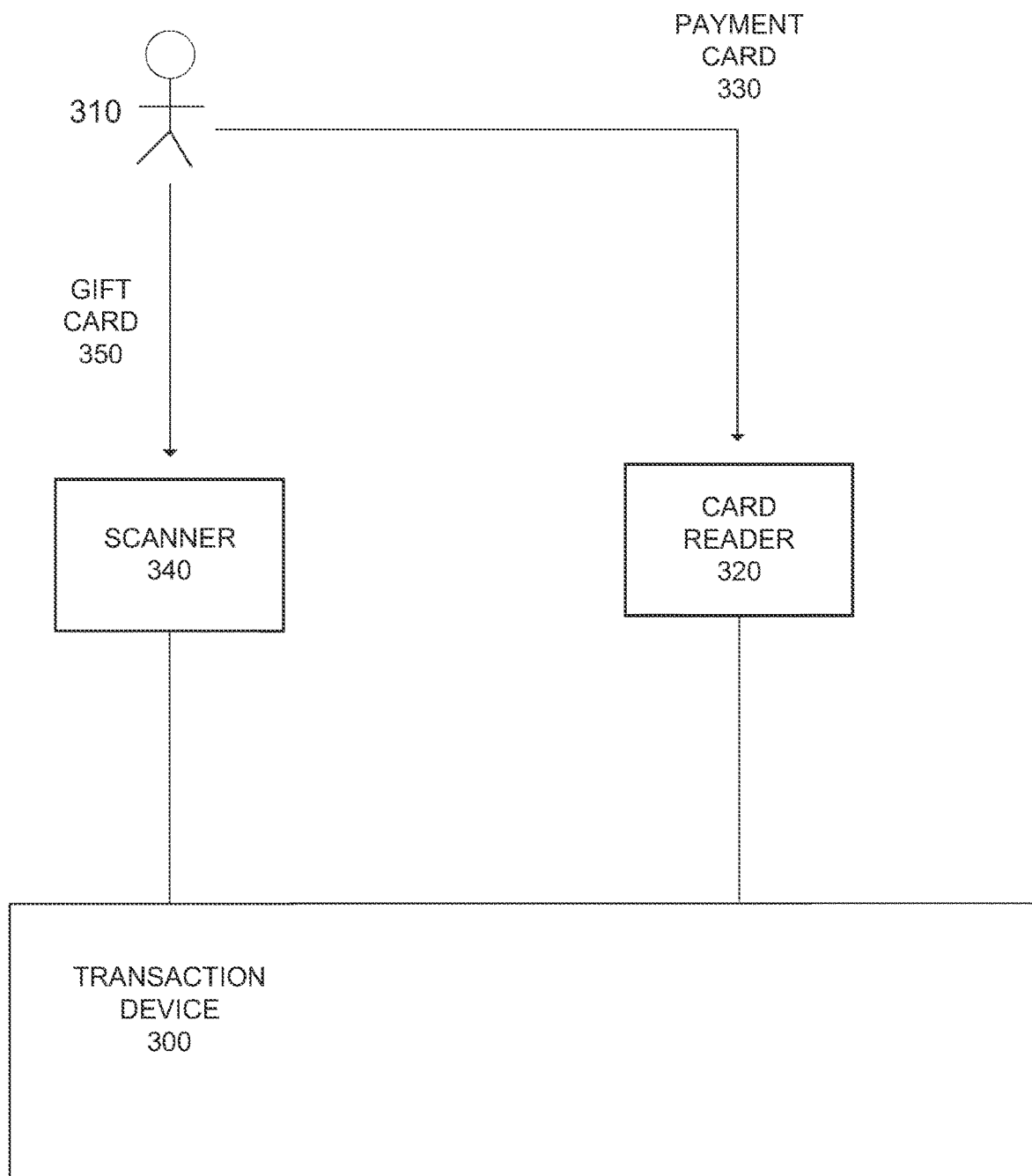
FIG. 3 shows an example of a payment interface provided at a point of sale in accordance with an embodiment of the invention.

FIG. 3 shows an example of a payment interface provided at a point of sale in accordance with an embodiment of the invention. A user 310 can interact with a transaction device 300. The user and transaction device can be provided at a point-of-sale POS, such as a merchant location. In some instances, the user provides a payment card 330, which can be read by a card reader 320 in communication with the transaction device.

In some embodiments, the card reader 320 is integrated as a part of the transaction device 300. Alternatively, the card reader can be a separate device from the transaction device and can convey information to the transaction device. The card reader can communicate with the transaction device via a hard-wired or wireless connection.

The card reader 320 can read information from the payment card 330 and transfer the information to the transaction device 300. The payment card can optionally be a physical card comprising a magnetic stripe, integrated chip, or have other forms of encoded information. The payment card can be a credit card, debit card, or other type of payment authenticating piece. The card reader can be capable of reading information from a magnetic chip, integrated chip or other forms of encoded information. For example, the card reader is capable of reading information from the payment card with a single swipe. The card reader can have a slot through which the payment card may pass through or in which a payment card can be inserted. The payment card can have a read head that can contact or come into close proximity to a magnetic strip of the payment card, an integrated chip of the payment card, or other encoded information on the payment card. The payment card can be in close proximity to the card reader in order to be read. For example, the card can be within about 10 feet, 5 feet, 2 feet, 1 foot, 3 inches, 2 inches, 1 inch, 0.5 inches, or contacting the card reader. In some instances, the card reader may have one or more characteristics, features, or components as described in U.S. Patent Publication No. 2012/0095907, which is hereby incorporated by reference in its entirety. Information read from the payment card can include information about the payment card, such as the payment card number, payment card type, payment card expiration date, security code on the payment card, cardholder name, and/or other information. The information can be transferred to via the transaction device in a raw form, which can decode the information. Alternatively, the card reader can decode some or all of the information prior to transferring the information to the transaction device.

In alternative embodiments, card-less payment techniques can be employed. For instance, payment information may be provided from a mobile device in proximity to a transaction device. It may be determined that a payer's mobile device is within a threshold proximity to a merchant's device. The payer may have an option to consent to enter into a payment transaction with the merchant without the presence of a payment card. In some instances, information identifying the payer may be provided to a merchant's device. Such information may include name of payer, photo of payer, or any other identifying information described elsewhere herein. Such information may be sent via the mobile device, or may be entered into the transaction device.

In some embodiments, the system further includes a scanner 340 that reads gift card 350 information. The scanner 340 can be integrated as a part of the transaction device 300. Alternatively, the scanner can be a separate device from the transaction device and can convey information to the transaction device. The scanner can communicate with the transaction device via a hard-wired or wireless connection. In some instances, the card reader 320 can provide the scanner functionality. The card reader may be the scanner, the scanner and the card reader may be integrated into a single device, or the scanner and card reader may be separate devices. A scanner can be configured to capture optical information. A scanner can capture signals from anywhere along the electromagnetic spectrum (e.g., visible light, infra-red, ultraviolet).

A gift card 350 can be provided in accordance with an embodiment of the invention. The gift card may belong to the same user who provides the payment card 330. The gift card can be an electronic gift card that was provided to the user via another individual or entity. The gift card can be provided in one or more forms. The systems and methods described herein may be capable of collecting information from the gift card in a single technique or may be capable of collecting information via multiple techniques. The systems and methods described herein may be capable of accommodating multiple types of gift cards, which may or may not include multiple types of electronic gift cards.

Any description of a gift card can apply to other cards or promotions that can utilize similar information. For example, coupons, discounts, specials, recommendations can be used instead of a gift card, or vice versa. These can include card or promotions that provide dollar values, percent discounts, multiple items-for-one item or any reduced number of items, or loyalty programs. For example, such other cards or promotions can include information useful for the creation of a user account (e.g., recipient's name, email address). In one illustration, a merchant can email a 30% off coupon to a recipient. In order to redeem the coupon, the recipient's name and/or email address is used to confirm the coupon. The coupon can be scanned for redemption, and information about the recipient, such as the recipient's name and/or email, can be received.

In one embodiment, a gift card is sent to a recipient in an electronic format. For example, the gift card can be emailed to the recipient, sent via SMS, provided through social networking site or other website, or transmitted via other means. A link to a gift card can be provided to the recipient via various electronic pathways (e.g., email, text, sms, provided via a social networking site, provided on a web page, etc.). A gift card can be provided for one or more specified merchant. For example, the gift card can be directed for a single merchant (e.g., the card can be redeemed only at "AAA Coffee Shop"), or can be specified for a group of merchants (e.g., the card can be redeemed at "AAA Coffee Shop", "BBB Coffee Shop", and/or "CCC Bakery"). The group of merchants can be the same type of merchants (e.g., coffee shops, bakeries, restaurants, electronics stores, etc.) or can include different types of merchants. The card can be redeemed at any of the merchants utilizing payment systems and methods described herein, or a subset of such merchants.

The gift card can be sent via a sender. The sender can utilize an application or program in order to send and/or personalize the gift card. The application or program can be the same application and/or program used to display or redeem the gift card on a recipient's device. The application and/or program can also be capable of performing one or more steps provided herein, such as initiating a financial transaction without requiring the presence of a physical payment card at the site of the transaction.

The gift card can be personalized to the recipient. For example the sender of the gift card can select one or more merchants at which the gift card can be redeemed. The sender can select one or more group of merchants at which the gift card can be redeemed. The group of merchants can include the same type of merchants, merchants in the same geographic area, or any combination of merchants. The sender can also select a theme, layout, or visual appearance of the gift card. For example, the sender can determine a text message to be included in the gift card. The text message can be selected from one or more pre-existing templates, or can be written in free form by the sender.

The sender can also include one or more image, video, and/or audio portion to be included in the gift card. The sender can select from one or more pre-existing image, video, and/or audio options. Alternatively, the sender can create and/or provide the image, video, and/or audio option. In one example, the sender can capture an image of the sender or anything else and include the captured image in the presentation of the gift certificate. Similarly, the sender can make a video and/or audio recording of the sender or anything else and include the video and/or audio in the presentation of the gift certificate. An image capture device, such as a camera (which can capture static and/or dynamic images), can be utilized by the sender. Similarly, an audio capture device, such as a microphone, can be used by the sender. The sender can upload a pre-existing image, video, and/or audio file to be included in the gift card. The sender can pre-edit the image, video, and/or audio file prior to uploading the file for use with the gift card. Alternatively, an application for the gift card can enable the sender to edit the file after the file has been uploaded.

The sender can select the layout of the text, images, and/or video. The sender can select a sequence of images or screens to be presented in the gift card. The sender can select one or more animation or animated sequence provided in the gift card. In some instances, the gift card can be provided in a user interactive form. For example, an electronic gift card can be provided to the recipient, who may click on the electronic gift card. The electronic gift card can respond to one or more user input, which can include a click, swipe, drag, keyboard press, gesture, voice command, or any other type of user input. In one example, a virtual gift card unwrapping process can be provided. The unwrapping process can incorporate one or more series of screens. In some instances, the unwrapping process can be an interactive process that incorporates recipient input. The unwrapping process can be customized by the sender. The message to the recipient and/or the form of the message can be customized by the sender.

The gift card can be viewed by the recipient via a device. For example, the gift card can be displayed on a user interface of the recipient's device. In one example, the electronic gift card or link to electronic gift card can be shown on a screen of a device, such as devices described elsewhere herein.

An electronic gift card can include information encoded therein. For example, the electronic gift card can include a recipient's name, recipient's email address, recipient's phone number, recipient's social networking information, gift card amount, merchants to which the gift card can apply, sender name, and/or sender email address.

An electronic gift card can be redeemed at a POS via multiple techniques. For example, the electronic gift card can include an optical representation that can be scanned at the POS. In some examples, the optical representation can be a barcode (e.g., 1D, 2D, or 3D barcode), quick response (QR) code, or other image that can have information encoded therein or accessible therefrom. The electronic gift card can be printed by the recipient, and the printout can be taken to the POS and scanned. In another example, the electronic gift card is displayed on a user device, such as mobile device (e.g., smartphone). The mobile device can be taken to the POS and the optical representation can be scanned. In some embodiments, the mobile device can utilize a web version of the electronic gift card. In other embodiments, specialized applications, such as a passbook (e.g., Passbook) can be provided, which can provide a shortcut to the electronic gift card or present the electronic gift card. In some instances, applications, such as those capable of permitting financial transactions at a point of sale or interacting with merchants that are part of the system, can also display the electronic gift card. Scanning may occur with use of a scanner, as described herein. Optical techniques can be utilized to scan the electronic gift card. The scanner can include an image capture device, such as a camera. The scanner can include a digital camera having desired resolution capabilities. In some instances, the scanner can need to be in close proximity to the gift card (e.g., in printed or electronic display format) in order to read the gift card. The representation of the gift card can need to be at the point of sale. The scanner can require that the electronic gift card be less than or equal to about 500 feet, 300 feet, 100 feet, 50 feet, 30 feet, 20 feet, 15 feet, 10 feet, 5 feet, 3 feet, 2 feet, 1 foot, 6 inches, 3 inches, 2 inches, or 1 inch away.

In other embodiments, the electronic gift card can be scanned via other techniques. For example, a mobile device can emit a wireless signal. The wireless signal can be captured by a scanner and/or transaction device. The mobile device can emit a signal that can be captured by a device within a predetermined proximity (e.g., less than or equal to about 5 miles, 3 miles, 2 miles, 1 mile, 0.5 mile, 0.2 miles, 50 feet, 30 feet, 20 feet, 15 feet, 10 feet, 5 feet, 3 feet, 2 feet, 1 foot, 6 inches, 3 inches, or 1 inch). In some instances, the predetermined proximity can vary based on signal strength. In some instances infra-red signals can be provided. In some instances, a physical manifestation of the electronic gift card, whether it be on a mobile device, can be within a predetermined proximity to a scanner in order to be scanned.

The scanner 340 can read information from gift card 350 and transfer the information to the transaction device 300. Information read from the gift card can include information about the recipient of the gift card, such as the recipient name, contact information (e.g., email address, mailing address, phone number, SMS, social networking information), and/or other information. The information can include information about the sender of the gift card (e.g., sender name, sender contact information, sender financial information). Gift card information can be provided (e.g., transaction amount, balance remaining, etc.). The information can be transferred to via the transaction device in a raw form, which can decode the information. Alternatively, the scanner can decode some or all of the information prior to transferring the information to the transaction device.

The payment card holder 330 and the gift card recipient 350 can be the same individual. Alternatively, different individuals can be the payment card owner and the gift card recipient. The individual who swipes the payment card and presents the gift card can be a customer of the merchant. Alternatively, an individual associated with the merchant, such as a clerk at a register can swipe the credit card and/or scan the electronic gift card.

The transaction device 300 can be provided at the POS. The transaction device can function as a register at the POS. Alternatively, the transaction device can be in communication with the register.

The transaction device can store the information received from the card reader and/or scanner in memory. The transaction device can communicate the information received from the card reader and/or scanner to an external device. In some instances, the external device can be one or more servers. Alternatively, the external device can be a customer's mobile device. The information from the gift card and payment card can be combined to create an account for the customer at the POS. The user account can be created without requiring any extra input from the customer. The customer need not perform any action prior to arriving at the POS and initiating the transaction in order to create the account.

Figure 4:
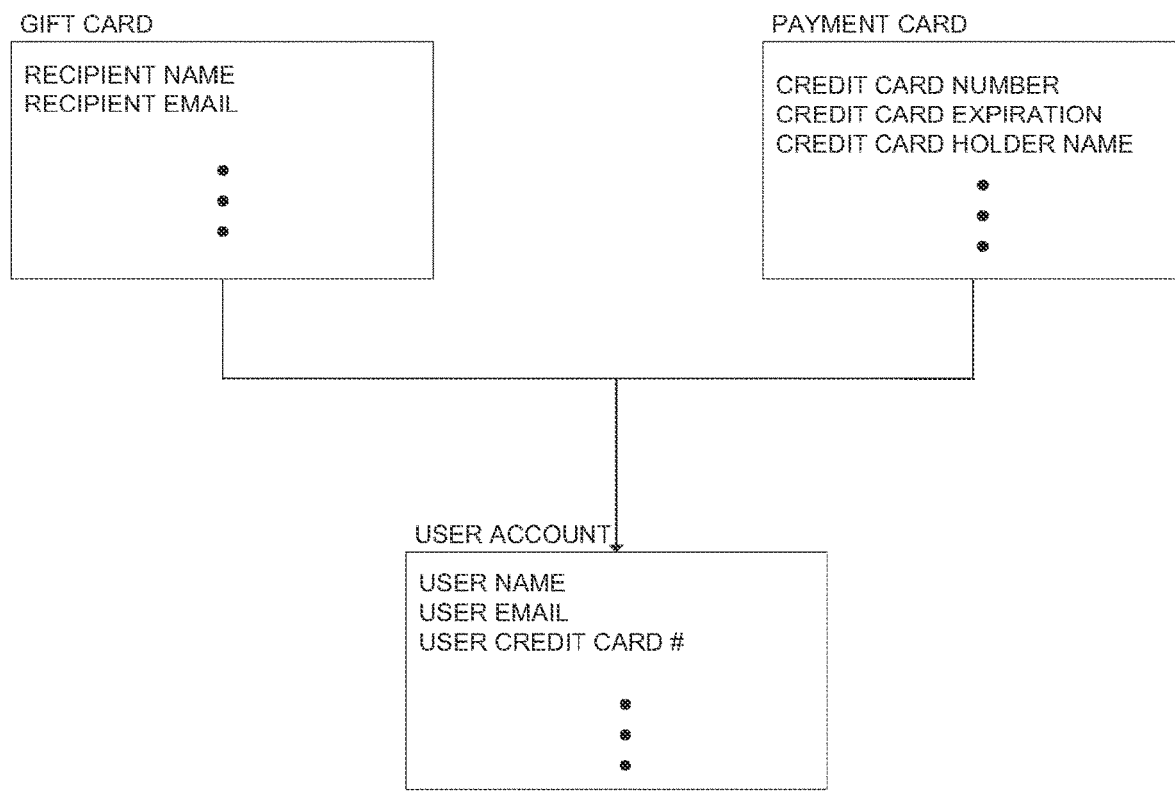
FIG. 4 illustrates an example of how information from multiple sources can be combined to automatically create a user account in accordance with an embodiment of the invention.

FIG. 4 illustrates an example of how information from multiple sources can be combined to automatically create a user account in accordance with an embodiment of the invention.

As previously described, a gift card, such as an electronic gift card can have information about a recipient of the gift card, or other related information. For example, the recipient name, and recipient email can be included. For example, a sender can specify a recipient name and recipient email when sending the electronic gift card to the recipient. Such information can be obtained by a transaction device when the electronic gift card is scanned.

Also, as previously described, a payment card can have related financial information about the payer. For example, the payment card (e.g., credit card, debit card) number, payment card expiration date, payment card QVC number, payment card holder name, and/or other info can be obtained. Such information can be obtained by a transaction device when the payment card is read.

In some embodiments, the information from the gift card and the payment card can be combined. For example, information from both the gift card and payment card can be collected at the transaction device. Alternatively, they can be collected from multiple devices but can be communicated to a common data repository. The combined information can be used to create a user account for the consumer. For example, a consumer name (e.g., gift card recipient name), consumer email (e.g., gift card recipient email), consumer credit card number (e.g., payment card number) can be used to create an account for the consumer.

In one example, the consumer does not have a pre-existing payment account with pre-stored payment card information. The merchant can be part of the payment system which can utilize a consumer's mobile device, and permit the consumer to conduct a financial transaction with the merchant via the mobile device. The consumer can approach the merchant without a pre-existing account. The consumer's account can be created using information from the consumer's payment card and/or gift card. In some instances, a combination of the consumer's payment card information and gift card can be used. For example, when the consumer approaches the merchant to make the transaction, the consumer can be presented with the option of creating an account on the spot. If the consumer accepts the option, the account can be created utilizing the payment and/or gift card information, without requiring the consumer to provide any additional information. This can provide an added sense of security to the consumer and/or the merchant.

In another example, the consumer can have a pre-existing payment account with information about the consumer (e.g., consumer's name, email address). However, the consumer may not yet have payment information (e.g., payment card information) stored with the account. Information from the payment card and/or gift card can be used to automatically fill in the payment information for the consumer's payment account. The payment card can be automatically added or linked to the account, so that in the future, the consumer can be able to pay through the account without having to bring out the physical payment card. For example, when the consumer approaches the merchant to make the transaction, the consumer can be presented with the option of creating adding the payment card information on the spot. If the consumer accepts the option, the account can be enabled to utilize the payment card information, without requiring the consumer to provide any additional information. Thus, payment card can be utilized without requiring that the consumer ever enter the payment card information.

Figure 5:
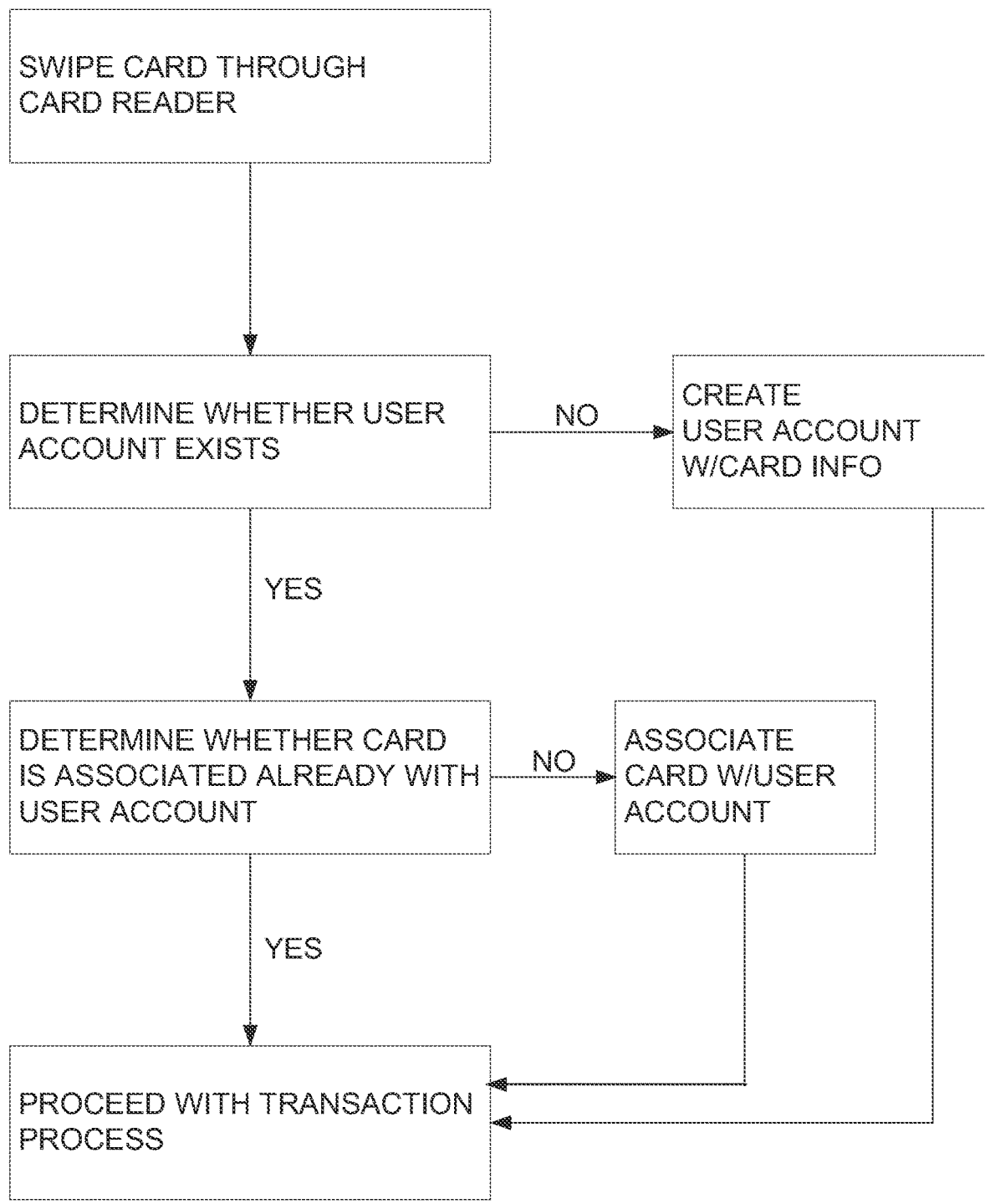
FIG. 5 provides an example of a process flow for utilizing a payment card swipe in accordance with an embodiment of the invention.

FIG. 5 provides an example of a process flow for utilizing a payment card swipe in accordance with an embodiment of the invention. One or more steps provided herein can be optional. In some instances, additional steps can be added or step can be modified or exchanged. The order can occur as presented, or alternative orders of steps can be permitted.

A payment card can be read by a card reader at a point-of-sale (POS). In one example, the payment card can be swiped by a card reader. Information from the payment card can be read and/or communicated via the swipe. In other examples, information can be transmitted to the card reader via optical signal, infrared signal, wirelessly, or any other technique.

Optionally, a gift card, such as an electronic gift card, can be provided at a point-of-sale. The gift card can be read by the card reader, scanner, or any other device. Information can be transmitted from the gift card via optical signal, infrared signal, wirelessly, or any other technique. Alternatively, information about the consumer, such as information from a gift card, can be manually entered at the POS, such as into a transaction device. The transaction device can function as a register for the merchant at the POS.

The system can determine, with aid of one or more processor, whether a user account exists for the cardholder. The user account can be for a payment system which can utilize pre-stored payment information for the user. For example, a user account can have credit card information that is accessible by the merchant via the system. The pre-stored information can be used to effect a transaction, even if the user does not present a physical card at the POS. In some embodiments, a consumer presenting a credit card does not already have a user account.

If a user account does not already exist, the consumer is presented with an option of creating a user account on the spot at the POS. If the consumer accepts the option of creating the user account, the payment card information is used to populate the user account. In some instances, the payment card information can be sufficient to populate the new user account in its entirety. In other embodiments, supplemental information can be provided. In one example, a consumer can also present a gift card during the same transaction at which the consumer presents the payment card. Information from the gift card (e.g., electronic gift card) can be used to supplement the information. For example, the gift card can include personal information (e.g., recipient name, recipient email address) about the recipient which can be used to populate part of the new user account. In other embodiments, the consumer can provide information at the POS location which can be used to create a portion of the user account. In some instances, the consumer can provide the information directly to a transaction device, via a mobile device, or can provide information to a merchant who can enter the information into the transaction device. In another example, another card or item of the consumer can be used to glean supplemental information about the consumer. Once the user account has been created, the transaction process can proceed.

If a user account already does exist, it can be determined, with aid of a processor, whether the payment card that is read is already associated with the user account. The user account may or may not already have payment card information. Pre-existing payment card information may or may not include the card being read in the current transaction. For example, other payment cards can be associated with the account, and the information from the other payment cards can be provided with the account.

If the payment card at the current transaction is not already associated with a pre-existing user account, the user can be presented with an option to add the payment card on the spot at the POS. If the consumer accepts the option of adding the payment card information to the user account, the payment card information is used to populate financial transaction information in the user account. The payment card information can be provided as supplemental information to existing user account information (e.g., user's name, user's email address). Additional information may or may not be required to link the payment card information to the user's account. Adding the payment card information at the POS via a swipe, can permit payment information to be linked to the user account without requiring the user to enter payment card information manually at any point. For example, when initially creating an account, the user can just provide certain information about the user (e.g., name, email address) without entering any payment information. The user can choose to link payment information to the user account via using the user's payment card. This can provide added security for the user and/or merchant. In some instances, the credit card can be confirmed for a financial transaction prior to adding the credit card to the user account. In other embodiments, once the payment account information has been linked to the user account, the transaction process can proceed.

If the payment card is already associated with the user account, the transaction process can proceed. In some instances, the transaction process can include conducting a financial verification process. For example, payment card and/or transaction information can be sent to an acquiring bank (e.g., merchant bank). The merchant bank can send payment card and/or transaction information to a credit card network (e.g., Visa, Mastercard, Discover. Amex, Diners, etc.). The payment card information and/or transaction information can then be sent from the card network to an issuing bank (e.g., consumer's bank). Verification can be provided in order to provide an actual transfer of funds and/or approve the transaction. In some instances, the financial check can be performed before, concurrently with, or after creating the account and/or linking a payment card to the account. In some instances, the account is created and/or the payment card information is added to the account only if the payment card passes the financial check.

In some instances, the payment may occur by using identifying information of the payer. Identifying information may include a name, photo, identification number or string, contact information (e.g., e-mail address, phone number), fingerprint, handscan, retinal scan, voice recognition, or any other identifying information. A system may receive consent from a payer to enter into a payment transaction with a merchant without the presence of a payment card. Upon receiving consent, information identifying the payer may be provided to the merchant. The merchant may provide a selection of the payer's user account and an instruction to process the payment transaction with the payer. A gift card associated with the payer's user account to process the payment transaction may be used. This may be performed using any of the systems and methods described elsewhere herein.

At any of the steps provided herein, a transaction device can be provided which can have a user interface. The user interface can prompt the merchant or consumer at any point during the process. For example, the user interface can provide an option for the consumer to create an account on the spot, if the consumer does not already have an option. An input can be provided to the user interface regarding whether the consumer would or would not like to create the account. In another example, the user interface can provide an option for the consumer to link the consumer payment card information with an existing account. Back-end processes can occur accordingly.

It should be understood from the foregoing that, while particular implementations have been illustrated and described, various modifications can be made thereto and are contemplated herein. It is also not intended that the invention be limited by the specific examples provided within the specification. The descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

The invention claimed is:

1. A method comprising:
    receiving, at a network payment system, a first indication of a first transaction between a user and a first merchant of a plurality of merchants, wherein the first transaction involves a first merchant point of sale (POS) provision receiving user information associated with the user during a first receiving operation, the user information received during the first receiving operation for use in both the first transaction and in an association to be stored, wherein the user information includes identifying information associated with the user and payment information associated with the user, wherein use of the user information received during the first receiving operation in the first transaction includes a transfer between the user and the first merchant made using the payment information associated with the user;
    storing the association between the identifying information and the payment information at the network payment system automatically after the first transaction is initiated and using the user information received during the first receiving operation, including by storing the identifying information and the payment information at the network payment system;
    receiving, at the network payment system, a second indication of a second transaction between the user and a second merchant of the plurality of merchants that is conducted using a second merchant POS provision, wherein the second indication includes the identifying information associated with the user; and
    in response to receipt of the second indication that includes the identifying information associated with the user, retrieving the association between the identifying information and the payment information that is stored in the network payment system and providing transaction instructions from the network payment system to the second merchant POS provision to process the second transaction using the identifying information and the payment information used in the first transaction in response to use of the user information in the first transaction, wherein the transaction instructions include at least the payment information.

2. The method of claim 1, wherein the first merchant POS provision receives the user information associated with the user during the first receiving operation at least in part by receiving the user information associated with the user from a machine-readable storage medium associated with the user during the first transaction.

3. The method of claim 2, wherein the machine-readable storage medium is a payment card that is used by the user to pay during the first transaction, and wherein the first merchant POS provision receives the user information associated with the user during the first receiving operation at least in part by reading the user information associated with the user from the payment card using a payment card reader of the first merchant POS provision.

4. The method of claim 1, wherein the first merchant POS provision receives the user information associated with the user during the first receiving operation at least in part by optically reading the user information associated with the user using an optical scanner of the first merchant POS provision.

5. The method of claim 1, wherein the first merchant POS provision receives the user information associated with the user during the first receiving operation at least in part by receiving a signal wirelessly.

6. The method of claim 1, wherein the user information associated with the user indicates at least one of an identity of the user or a preference of the user.

7. The method of claim 1, further comprising identifying that the first merchant is of a first type of merchant and the second merchant is of a second type of merchant.

8. The method of claim 1, further comprising identifying that the first merchant and the second merchant are both of a same type of merchant.

9. The method of claim 1, further comprising:
    generating, at the network payment system, a user account associated with the user, the user account comprising the user information associated with the user.

10. The method of claim 1, wherein the transaction instructions include the payment information associated with the user.

11. The method of claim 1, wherein providing the transaction instructions from the network payment system to the second merchant POS provision is configured to cause processing of the second transaction using at least the payment information associated with the user of the user information associated with the user.

12. The method of claim 1, wherein storing the association between the identifying information and the payment information at the network payment system occurs contemporaneously with at least part of the first transaction.

13. The method of claim 1, wherein storing the association between the identifying information and the payment information at the network payment system occurs after the first transaction.

14. A system comprising:
    one or more processors of a network payment system; and
    one or more memory units communicatively coupled to the one or more processors and storing instructions that, when executed by the one or more processors, cause the one or more processors to perform operations comprising:

receiving, at the network payment system, a first indication of a first transaction between a user and a first merchant of a plurality of merchants, wherein the first transaction involves a first merchant point of sale (POS) provision receiving user information associated with the user during a first receiving operation, the user information received during the first receiving operation for use in both the first transaction and in an association to be stored, wherein the user information includes identifying information associated with the user and payment information associated with the user, wherein use of the user information received during the first receiving operation in the first transaction includes a transfer between the user and the first merchant made using the payment information associated with the user;

storing the association between the identifying information and the payment information at the network payment system automatically after the first transaction is initiated and using the user information received during the first receiving operation, including by storing the identifying information and the payment information at the network payment system;

receiving, at the network payment system, a second indication of a second transaction between the user and a second merchant of the plurality of merchants that is conducted using a second merchant POS provision, wherein the second indication includes the identifying information associated with the user; and in response to receipt of the second indication that includes the identifying information associated with the user, retrieving the association between the identifying information and the payment information that is stored in the network payment system and providing transaction instructions from the network payment system to the second merchant POS provision to process the second transaction using the identifying information and the payment information used in the first transaction in response to use of the user information in the first transaction, wherein the transaction instructions include at least the payment information.

15. The system of claim 14, wherein the first merchant POS provision receives the user information associated with the user during the first receiving operation at least in part by receiving the user information associated with the user from a machine-readable storage medium associated with the user.

16. The system of claim 15, wherein the machine-readable storage medium is a payment card, and wherein the first merchant POS provision receives the user information associated with the user during the first receiving operation at least in part by reading the user information associated with the user from the payment card using a payment card reader of the first merchant POS provision.

17. The system of claim 14, wherein the first merchant POS provision receives the user information associated with the user during the first receiving operation at least in part by optically reading the user information associated with the user using an optical scanner of the first merchant POS provision.

18. The system of claim 14, wherein the first merchant POS provision receives the user information associated with the user during the first receiving operation at least in part by receiving a signal wirelessly.

19. The system of claim 14, wherein the transaction instructions include the payment information.

20. A non-transitory computer readable storage medium having embodied thereon a program, wherein the program is executable by a processor to perform a method comprising:

receiving, at a network payment system, a first indication of a first transaction between a user and a first merchant of a plurality of merchants, wherein the first transaction involves a first merchant point of sale (POS) provision receiving user information associated with the user during a first receiving operation, the user information received during the first receiving operation for use in both the first transaction and in an association to be stored, wherein the user information includes identifying information associated with the user and payment information associated with the user, wherein use of the user information received during the first receiving operation in the first transaction includes a transfer between the user and the first merchant made using the payment information associated with the user;

storing the association between the identifying information and the payment information at the network payment system automatically after the first transaction is initiated and using the user information received during the first receiving operation, including by storing the identifying information and the payment information at the network payment system;

receiving, at the network payment system, a second indication of a second transaction between the user and a second merchant of the plurality of merchants that is conducted using a second merchant POS provision, wherein the second indication includes the identifying information associated with the user; and in response to receipt of the second indication that includes the identifying information associated with the user, retrieving the association between the identifying information and the payment information that is stored in the network payment system and providing transaction instructions from the network payment system to the second merchant POS provision to process the second transaction using the identifying information and the payment information used in the first transaction in response to use of the user information in the first transaction, wherein the transaction instructions include at least the payment information.

21. The non-transitory computer readable storage medium of claim 20, wherein the user information associated with the user indicates a preference of the user.

22. The non-transitory computer readable storage medium of claim 20, the method further comprising:

generating, at the network payment system, a user account associated with the user, the user account comprising the user information associated with the user.

* * * * *